United States Patent [19]

Gaeddert et al.

[11] 3,995,412
[45] Dec. 7, 1976

[54] ROW UNIT ATTACHMENT FOR COMBINES

[75] Inventors: Melvin V. Gaeddert, Newton, Kans.;
Leonard W. Hodson, Claremore, Okla.; David J. Jordan, Newton, Kans.

[73] Assignee: Hesston Corporation, Hesston, Kans.

[22] Filed: Aug. 14, 1974

[21] Appl. No.: 497,216

[52] U.S. Cl. .................... 56/98; 56/15.3; 56/DIG. 9
[51] Int. Cl.[2] ........................................ A01D 45/02
[58] Field of Search ............ 56/98, 119, 15.5, 15.6, 56/15.8, 15.9, 14.3, DIG. 9, 312, 14.2, 104, 153

[56] References Cited
UNITED STATES PATENTS

| | | | |
|---|---|---|---|
| 2,287,304 | 6/1942 | Hall | 56/312 |
| 2,835,097 | 5/1958 | Sullivan | 56/98 |
| 2,970,420 | 2/1961 | Schmidt | 56/98 |
| 3,392,514 | 7/1968 | McEachern et al. | 56/98 |
| 3,783,594 | 1/1974 | Watt et al. | 56/15.8 |
| 3,785,130 | 1/1974 | Gaeddeit | 56/98 |
| 3,834,142 | 9/1974 | Johnston et al. | 56/15.8 |
| 3,858,384 | 1/1975 | Maiste et al. | 56/104 |

*Primary Examiner*—J.N. Eskovitz
*Attorney, Agent, or Firm*—Schmidt, Johnson, Hovey & Williams

[57] ABSTRACT

A harvesting machine, such as a combine, may be adapted for the harvesting of row crops by attaching a series of laterally spaced-apart, individual row units across the header of the combine. Each unit attachment is of low-profile configuration having a pair of downwardly and forwardly extending, obstruction-free dividing members which become disposed on opposite sides of a crop row during operation, the drive for gathering mechanism on the members being disposed below and to one side of the crop delivery passage defined between each pair of dividing members whereby to render the passage wholly unobstructed from top-to-bottom and front-to-rear thereof to facilitate the orderly, clog-free movement of crops rearwardly through the passage and into the header for further processing. The dividing members are mounted for adjustable shifting transversely as a unit along the header to accommodate changes in row spacing from one field to the next, and yet each member is vertically swingable independently of the other during operation to allow individual compensation for changes in ground contour. A drive shaft common to all of the units extends across the header to provide driving power for the gathering mechanism of the members and is provided with relatively telescoping sections to accommodate row spacing adjustment of the attachment without disengaging the shaft.

23 Claims, 9 Drawing Figures

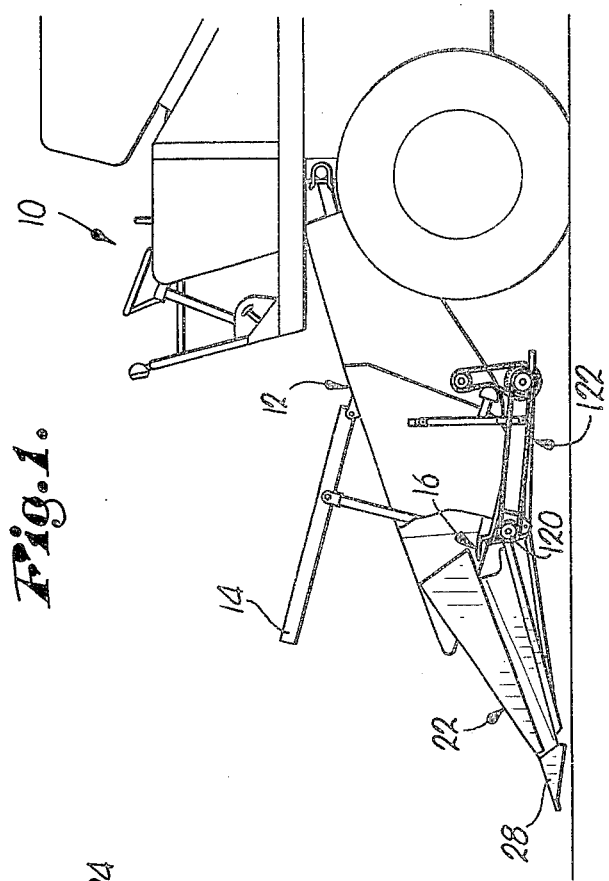
Fig. 1.
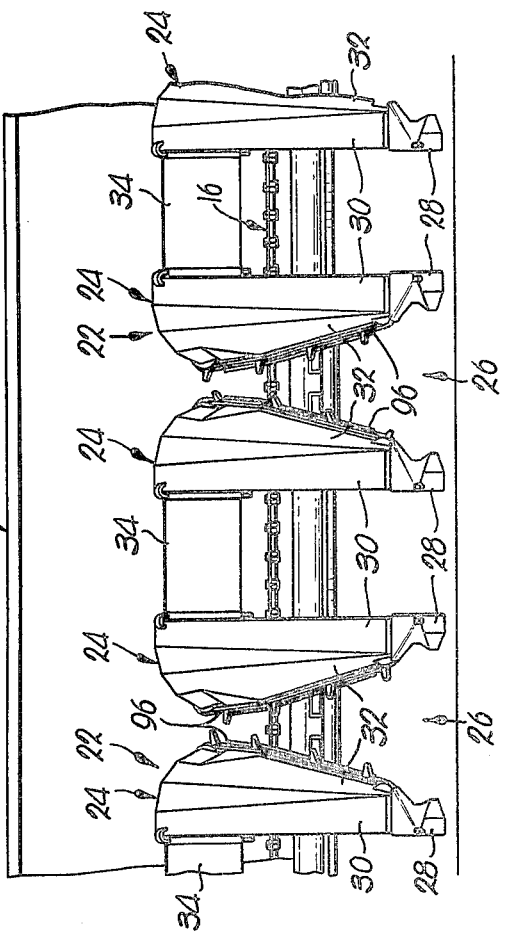
Fig. 2.
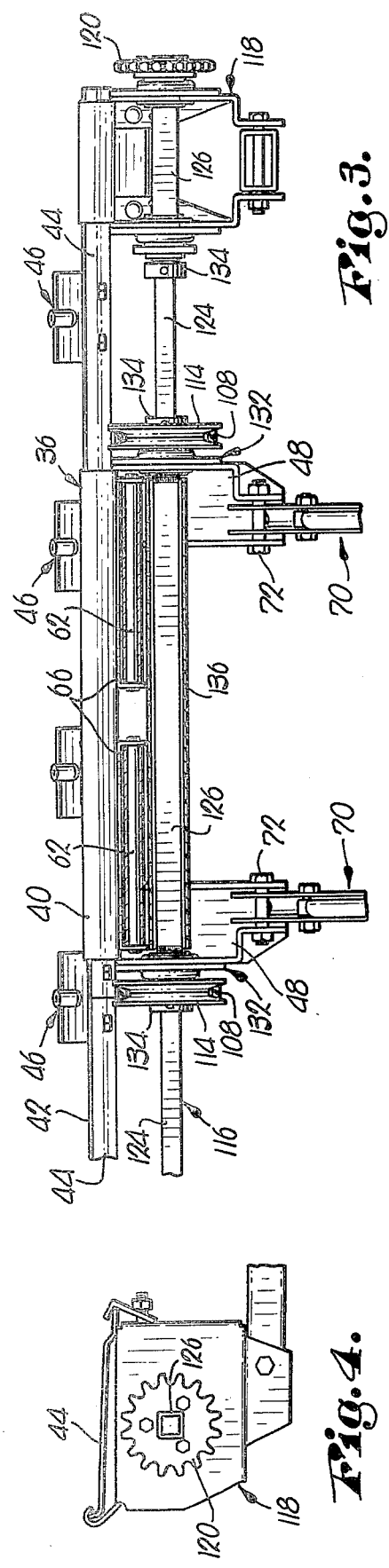
Fig. 3.
Fig. 4.

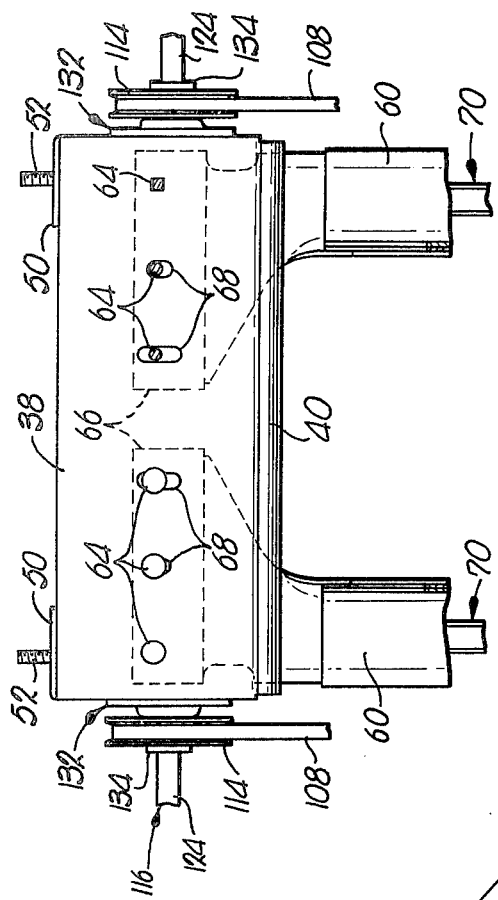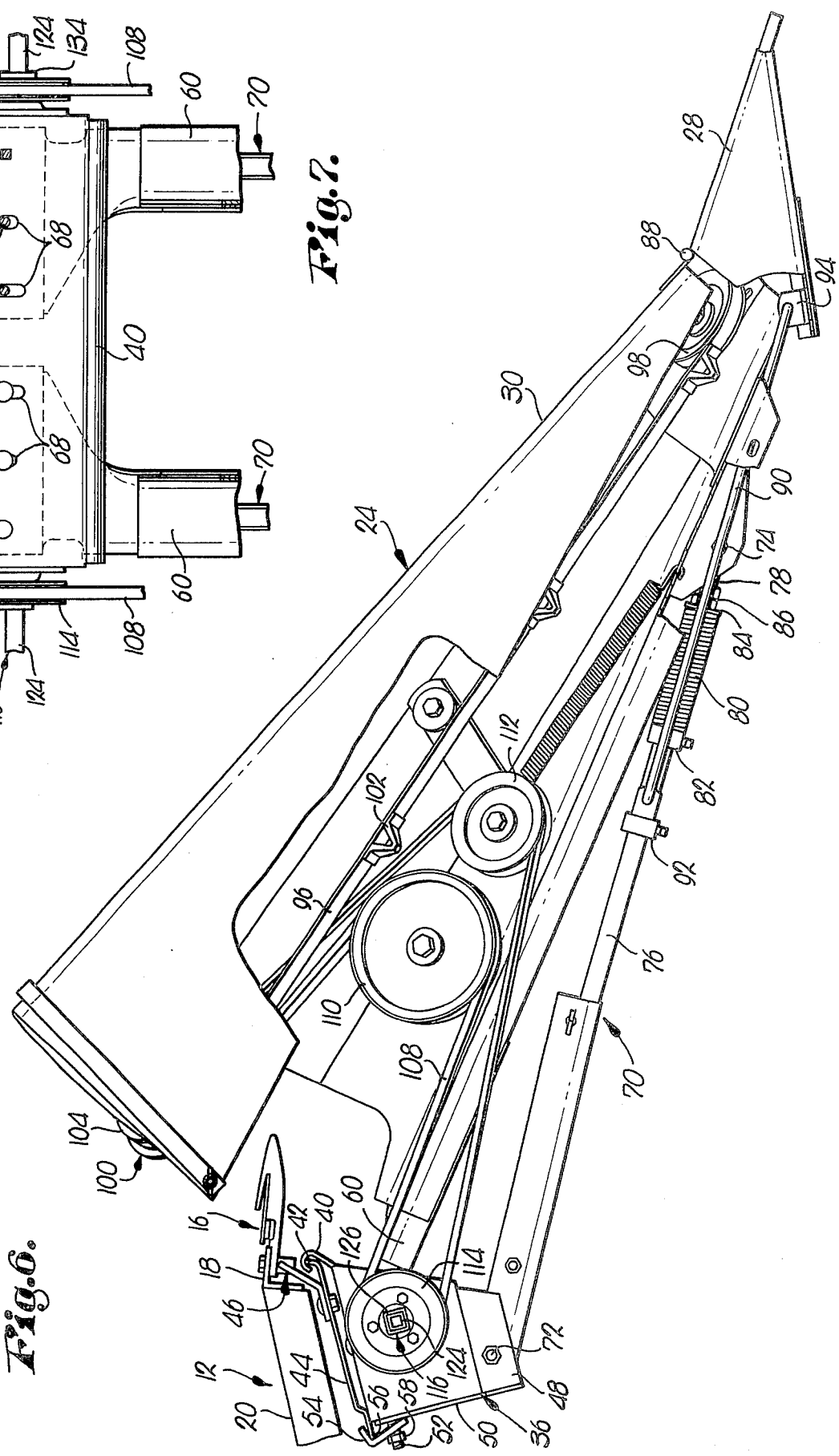

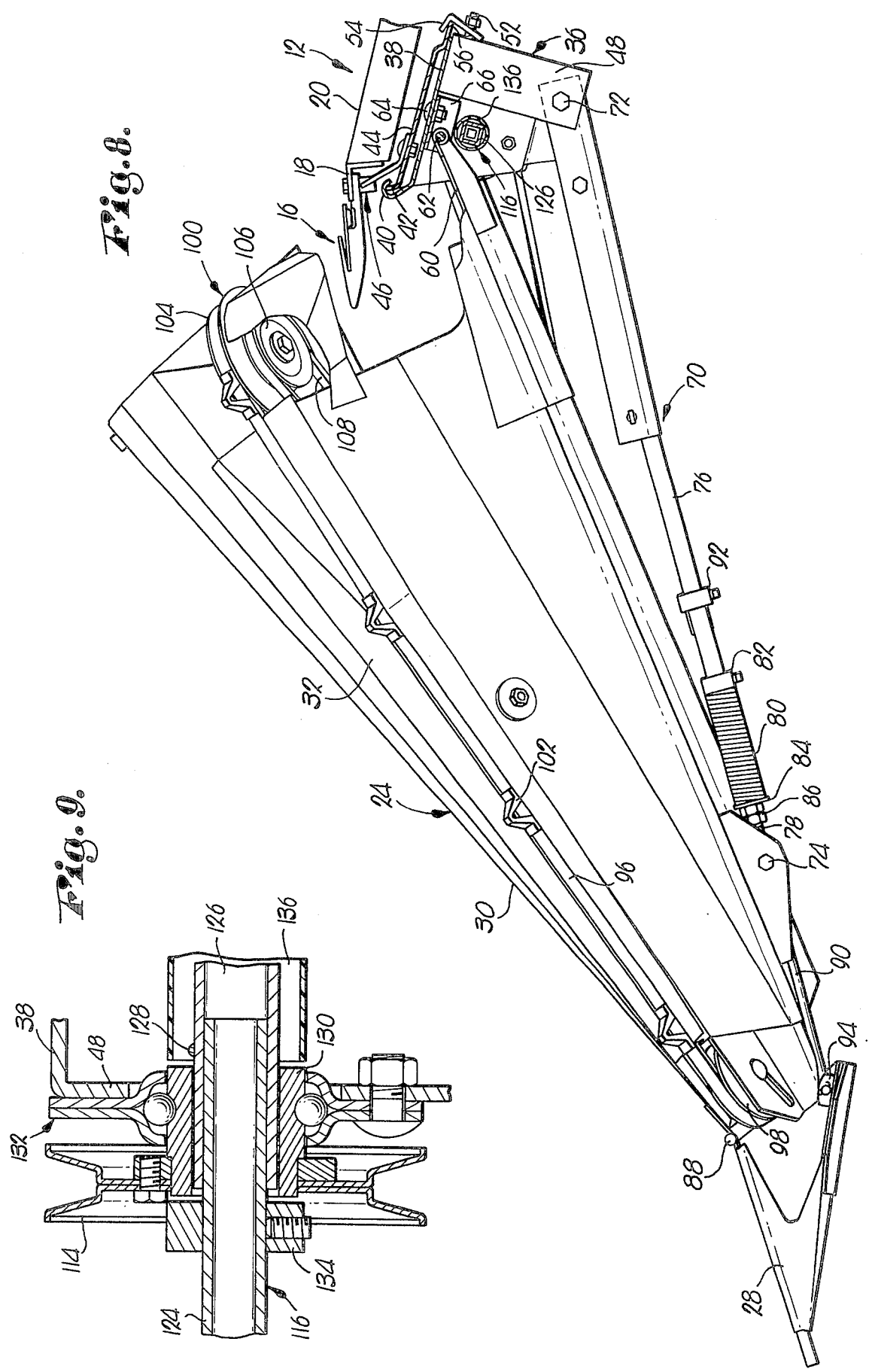

ROW UNIT ATTACHMENT FOR COMBINES

This invention relates to crop harvesting apparatus and, more particularly, to apparatus in the nature of individual row unit attachments for harvesting machines such as a combine, the attachments performing the same general function, for example, of those disclosed in detail in U.S. Letters Pat. No. 3,785,130, assigned to the assignee of the present invention.

One important object of the invention is to provide an improvement over the row unit attachments of said patent with respect to the relatively "high profile" characteristics of such earlier attachments. In this regard, while such earlier attachments have proven to be highly reliable and quite desirable in many harvesting situations, including instances of downed or leaning row crops, a substantial amount of the drive apparatus for the earlier attachments is disposed above or overhead of the crop delivery passage of the attachments. Hence, crops advancing rearwardly through the passage and toward the pan of the combine have a tendency to sometimes become entangled with the overhead drive mechanism and thus clog the discharge throat area of the passages. Moreover, upright supporting structure for the drive mechanism tends to unduly confine and restrict the crop as it advances rearwardly toward the discharge throat, thereby further tending to induce a clogging or jamming condition which necessarily requires an undesirably costly and time-consuming shutdown in harvesting operations in order to permit the operator to clear the clogged area.

Accordingly, another important object of the present invention, pursuant to the foregoing, is to provide a low-profile row crop harvesting attachment for combines and the like which eliminates the aforementioned clogging tendencies of high-profile row attachments and which provides such additional benefits as improved operator visibility, less unharvested crop left behind, and greater safety to the operator in view of the less exposed nature of the drive mechanism.

An additional important object of the instant invention is to provide an improved drive for the attachments which not only enables the attachments to be rendered low-profile in overall configuration, but which also permits the attachments to be shifted transversely along the header in order to adjust the relative positions of the attachments for changes in row spacing.

A further important object of this invention is to provide row unit attachments of the foregoing nature wherein each pointed divider member of a unit is independently vertically swingable on the header in order to permit individual compensation by each divider member for changes in ground contour that it experiences, all of which increases the pickup of downed and fallen crops between and across rows to maximize harvest yields.

A still further important object of the present invention is the provision of a drive as aforesaid which is relatively non-complex, requires little maintenance and, should maintenance be required, can be relatively quickly and easily disassembled and repaired or replaced as necessary.

Another important object of this invention is to provide low-profile row unit attachments having the foregoing attributes which can be mounted in place upon the header of a combine without undue time, effort and complications.

Yet another important object of the invention is to provide flotation for the individual divider members of the row unit attachments through structure which is consistent with the low-profile goals of the invention.

A still further important object of this invention is to provide an arrangement whereby the nose of each individual divider member may be pointed to facilitate its disposition between crop rows and yet any tendency for the noses to dig into the ground during downward swinging of the members is automatically thwarted by structure which swings the noses in the opposite direction to maintain the same substantially parallel to the ground at all times.

In the drawings:

FIG. 1 is a fragmentary, said elevational view of a combine with its reel removed and with row unit attachments embodying the concepts of the present invention mounted on the front of its header;

FIG. 2 is a fragmentary, front elevational view of the combine and row unit attachments;

FIG. 3 is an enlarged, fragmentary vertical cross-sectional view through the drive for the row unit attachments looking rearwardly toward the header adjacent the right end of the header;

FIG. 4 is an enlarged, fragmentary side elevational view of the drive and associated mounting structure at the right end of the header as seen in FIG. 1;

FIG. 6 is an enlarged, fragmentary, side elevational view of a row unit and associated combine structure taken from one side of the unit at the opposite end of the header, certain parts being partially broken away to reveal constructional details;

FIG. 7 is an enlarged, fragmentary top plan view of the supporting frame for each row unit;

FIG. 8 is a view similar to FIG. 6 but taken from the opposite side of the dividing member shown in FIG. 6; and FIG. 9 is an enlarged, fragmentary detail view of a portion of the drive illustrating in particular the telescoping nature of the drive shaft.

Figure 5:
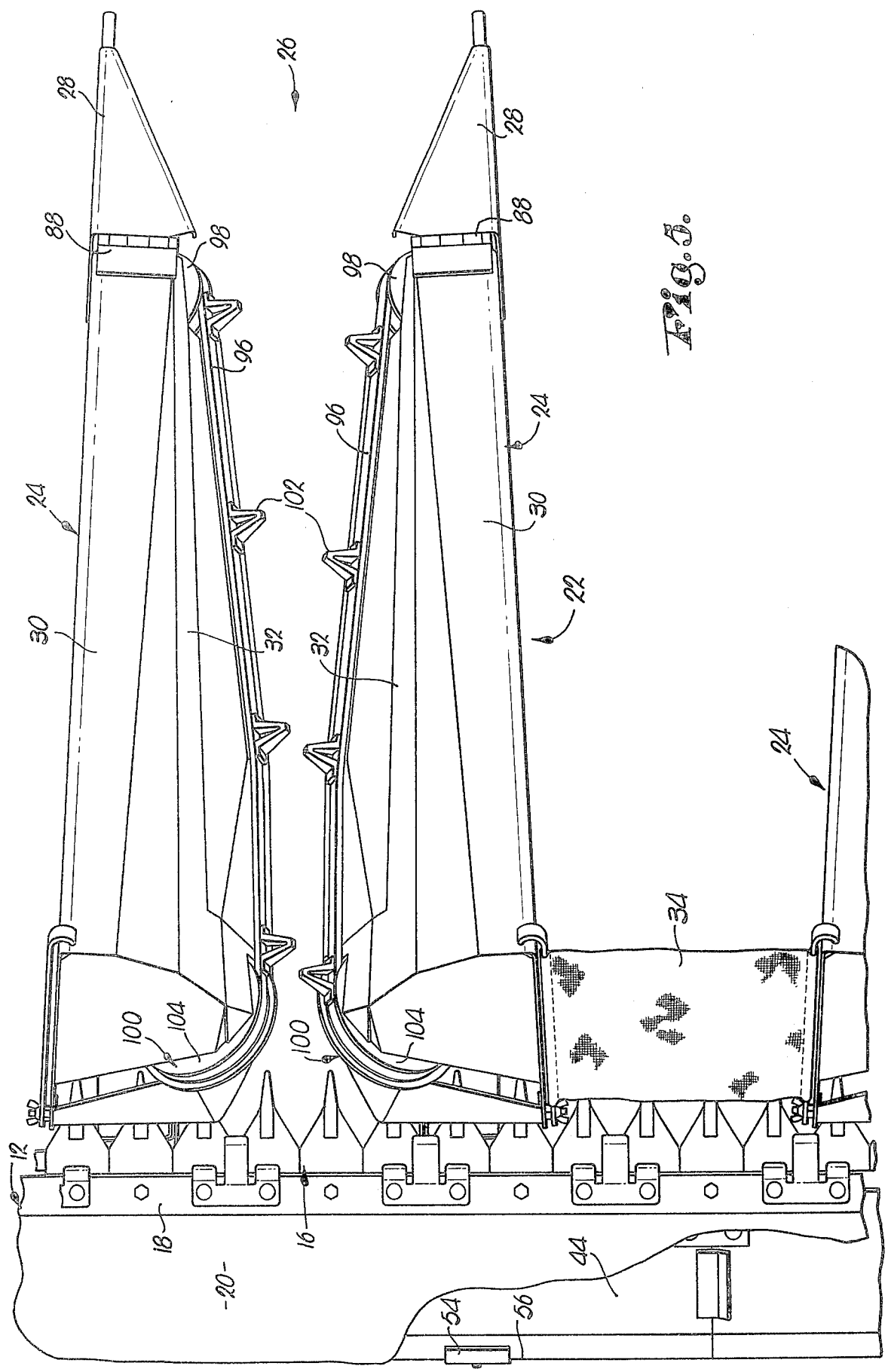
FIG. 5 is an enlarged, fragmentary top plan view of one row unit and associated portions of the combine header, certain parts being partially broken away to reveal details of construction.

A harvesting machine 10, shown in FIG. 1, has a vertically swingable header 12 that may carry one of various types of reels (not shown) on supporting structure 14 for use when the machine 10 is utilized to harvest certain crops such as, for example, wheat. In accordance with the principles of the present invention, however, the machine 10, without the aforementioned reel, is utilized for harvesting row crops and has been adapted specifically for such purpose by attachment thereto of apparatus forming the basis of the present invention.

The header 12 has a sickle assembly 16 that extends across the front of header 12 transversely of the normal path of travel of machine 10 for severing crops as they become presented to sickle 16 by advancement of machine 10. Sickle assembly 16 is basically mounted upon an angle bar 18 across the front of header 12, commonly referred to as cutter bar, and bar 18 is in turn secured to severed crop-receiving structure 20 commonly referred to as the pan of header 12.

In order to adapt the machine 10 for row crop harvesting, the header 12 is provided with a series of row unit attachments 22 mounted across the front of header 12 in laterally spaced relationship to one another as illustrated in FIG. 2. Each attachment 22 includes a pair of low-profile dividing members 24 which are virtually mirror images of one another and which extend downwardly and forwardly from header 12 in spaced-apart relationship to present a crop delivery passage 26 extending from the front of members 24 rearwardly to pan 20. Each of the members 24 is elongated and basically triangular as viewed in plan (FIG. 5), tapering horizontally to a forwardmost nose 28 that helps position the members 24 on opposite sides of a crop row during operation. Each member 24 is also basically triangular in side elevation (FIGS. 6 and 8), tapering vertically as nose 28 is approached.

As perhaps shown best in FIGS. 1 and 2, therefore, the attachments 22 present a clean, low-profile appearance without an excess of overhead obstructions above passages 26 which would tend to interfere with the orderly movement of crops rearwardly through attachments 22 and into pan 20 after severance by sickle 16. As clearly shown, the upwardly and rearwardly inclined, uppermost longitudinal surface 30 of each member 24 represents the uppermost extent of any structure that defines passage 26 inasmuch as no overhead, passage-defining and restricting drive mechanisms are involved, and each passage 26 is itself rendered wide-mouthed by virtue of the fact that the inner longitudinal surfaces 32 of each attachment 22 slope outwardly away from passage 26 in a lateral direction as upper surfaces 30 are approached. As illustrated in FIGS. 2 and 5, curtains 34 may be removably provided between adjacent attachments 22 in order to block off corresponding areas behind curtains 34 to the reception of crop materials.

Turning now to a more detailed description of the attachments 22, each has a generally inversely U-shaped supporting frame 36 at the upper rear thereof that is shown best in FIGS. 6, 7 and 8. The top 38 of frame 36 is provided with an upturned hook 40 along its forwardmost edge which is looped over and upright edge 42 of an overlying plate 44 that is in turn removably attached to cutter bar 18 by a number of fastening assemblies 46. Plate 44 may be segmented so that one plate is provided for each attachment 22, or it may be continuous, extending the full width of header 12. The segmented arrangement is preferred, however, in order to facilitate installation and removal procedures.

The sides 48 of frame 36 have generally upright rear stretches 50 provided with a pair of bolts 52 that receive clamps 54 hooked over the rear edge 56 of plate 44. By loosening nuts 58 on bolts 52 the clamps 54 may be rendered sufficiently loose to permit frame 36 to be shifted along the track formed by edges 42 and 46 in order to vary the transverse position of attachment 22 upon header 12.

As shown best in FIGS. 3–7, the members 24 of each attachment 22 have rearmost extensions 60 that swingably mount upon horizontal shafts 62 supported by frame 36 immediately below top 38 thereof. Shafts 62 are independent of one another, although coaxial, such that the two members 24 of each attachment 22 are swingable vertically independently of one another about the same axis. As shown in FIG. 7, the bolts 64 which mount the brackets 66 for shafts 62 in place below top 38 fit through slotted openings 68 in top 38 to provide a degree of angular adjustment of the members 24 when bolts 64 are loosened. In this manner the width of passage 26 adjacent the noses 28 may be widened or narrowed to an extent as desired.

Downward swinging of the members 24 is limited by an arm 70 below each member 24 and extending between the same and its frame 36. As shown in FIGS. 3, 6 and 8 the upper end of each arm 70 is pivotally connected at 72 to the corresponding side 48 of its frame 36, while the opposite end of each arm 70 is pivotally connected at 74 to the underside of its member 24 just rearwardly of nose 28. A main tube 76 of arm 70 receives a threaded rod 78 (connected to pivot 74) so that rod 78 can move axially within tube 76, restrained only by a compression spring 80 captured between a set collar 82 on tube 76 and a disc 84 on rod 78. By adjusting nuts 86 along rod 78, the compression of spring 80 can be changed so that the upward lift applied by spring 80 against member 24 can be adjusted as necessary or desirable. In normal practice, spring 80 is set so that disc 84 bottoms-out against the end (not shown) of tube 76 in order to provide a positive lower limit for the swingable member 24. Even with such positive limit, however, the spring 80, since highly compressed, always exerts a lifting force against its member 24 to provide a degree of flotation thereto in order to facilitate movement of the member 24 up and over obstacles which may confront the nose 28.

Noses 28 of the members 24 are provided with hinges 88 to permit the same to swing up and down when required. In this regard it is desirable to have noses 28 substantially pointed as shown in order to facilitate movement between adjacent rows of crops, but at the same time it is important that noses 28 not be allowed to dig into the ground such as they might normally have a tendency to do because of the rather steep inclination of the members 24. Accordingly, provision is made to maintain noses 28 in a substantially level or ground paralleling condition at all times throughout normal operation regardless of the fact that the members 24 may rise and fall as the machine 10 advances across the field. Such automatic leveling is accomplished in the present invention through the use of a stiff link 90 (FIG. 6) that is pivotally secured at its upper end to arm 70 through a set collar 92 and is pivotally secured at its opposite end to the rear of nose 28 through an upstanding lug 94. Hence as member 24 swings downwardly, for example, link 90 responsively swings nose 28 upwardly in the opposite direction to compensate for downward swinging of the member 24. When member 24 swings upwardly, link 90 responds by pulling in the opposite direction on nose 28 to swing the latter downwardly in an effort to maintain it substantially level as shown in FIGS. 1, 6 and 8.

Each attachment 22 is provided with gathering means in the nature of a pair of endless, lugged elements 96 that are disposed on opposite sides of passage 26 and are carried by the opposed members 24. As shown in FIGS. 5, 6 and 8, each element 96 is looped around a front pulley 98 disposed just behind nose 28 and a rear double pulley 100 so that the elements 96 extend longitudinally of the members 24 from the front of passage 26 to the rear thereof adjacent pan 20. Pulleys 98 and 100 are inclined horizontally as well as vertically so that elements 96 not only extend upwardly and rearwardly, but are also sloped laterally to project the lugs 102 as high as possible beyond the adjacent surfaces 30 and 32 of members 24 adjacent noses 28. As perhaps most clearly seen in FIG. 2, the respective planes of the elements 96 converge upwardly as the center of passage 26 is approached, and the resulting projection of lugs 102 upwardly to an extent rather than purely horizontally helps assure early engagement of the crops by lugs 102 as crops enter passage 26. In this respect also, the outwardly inclined inner surfaces 32 of members 24 helps assure such early contact by lugs 102, thus contributing to improved overall control of the crop during harvesting operations.

While the upper half 104 of each rear double pulley 100 carries element 96, the lower half 106 (FIG. 8) carries an endless drive belt 108 that extends forwardly therefrom and has its opposite stretches looped about a large idler 110 (FIG. 6) and a smaller tensioning idler 112 before doubling back below and behind pulley 100 to entrain a drive pulley 114 on frame 36. Drive pulley 114 is one of several such pulleys carried by a common drive shaft 116 that extends along header 12 and is common to all of the attachments 22 in order to provide a single source of driving power for the gathering elements 96. Each gathering element 96 has its own drive pulley 114 on shaft 116 such as clearly illustrated in FIG. 3 wherein is shown a pair of pulleys 114 outside of opposite sides 48 of frame 36.

Drive shaft 116 extends horizontally through all of the frames 36 just below the swinging shafts 62 for the respective members 24 in order to place the axis of swinging of members 24 in close juxtaposition to the longitudinal axis of drive shaft 116. In this manner, the two sets of axes are rendered practically coaxial such that vertical swinging of the members 24 has only minimal effect on the tension of drive belts 108. Any tendency for belts 108 to loosen, for example, during upward swinging of the members 24 is compensated for by the spring-loaded tensioning idlers 112.

At its rightmost extreme viewing FIG. 3, the shaft 116 extends through and is journaled by a small framework 118 releasably and shiftably mounted on the track plate 44 in the same manner as frame 36. An input sprocket 120 on the outer end of shaft 116 receives power from a chain and sprocket power train 112 (FIG. 1) coupled with other power mechanism (not shown) on the header 12. In this manner power taken from header 12 is delivered to drive shaft 116 through power train 122 and sprocket 120 for driving all of the attachments 22 in unison.

With reference being made especially to FIG. 9, it may be seen that the drive shaft 116 comprises a number of relatively telescoping, tubular sections, there being sections of two different sizes, the smaller of which is denoted by the numeral 124, and the larger of which is denoted by the numeral 126. The larger sections 126 extend between and partially beyond the opposed sides 48 of their frames 36, while the smaller sections 124 extend between adjacent frames 36 and are telescopically received within the proximal ends of larger sections 126. A welded bead 128 adjacent opposite ends of each larger section 126 inside of sides 48 is disposed to abut the proximal end of a hub 130 within bearings 132 for shaft 116, thereby preventing axial displacement of the larger sections 126 beyond the confines of their respective frames 36. On the other hand, set collars 134 may be provided adjacent opposite ends of each smaller section 124 outside of pulleys 114 for abutment against the opposite ends of hubs 130 in order to limit the axial displacement of sections 124 once collars 134 have been firmly tightened in place. Loosening of appropriate set collars 134 permits the smaller sections 124 to be extended or retracted relative to their larger sections 126 to permit adjustments of the attachments 22 along header 12 in order to accommodate changes in row spacing, all without disengaging drive shaft 116.

It is important to recognize, as shown in FIGS. 4, 6 and 8, that the two sections 124 and 126 of drive shaft 116 are each rectangular in cross-sectional configuration, thereby enabling rotative power from one section to be transmitted to the next, and so forth, along shaft 116 when input sprocket 120 is driven by power train 122. Additionally, it is to be pointed out that a safety tube 136 loosely encircles the large section 126 carried by each frame 36 as shown in FIGS. 3 and 9 in order to minimize exposure to such rotating sections.

OPERATION

The use and operation of attachments 22 in conjunction with machine 10 should be readily apparent from the foregoing detailed description. The attachments 22 may be easily installed upon header 12 by securing the plates 44 in place along and below cutter bar 18, whereupon the proper positions of attachments 22 can be obtained by loosening clamps 54 and set collars 134 for adjustably shifting frames 36 along plates 44 until the space between adjacent attachments is consistent with the row spacing of the field being harvested. Sections 124 and 126 of drive shaft 116 telescope relatively of one another during such adjustment but never become disengaged with one another such that when the final adjusted position is reached, shaft 116 is still in an operative condition. Tightening of the collars 134 and clamps 54 fixes the attachments 22 in their final positions, whereupon harvesting operations can begin.

As the machine 10 advances across the field, the passages 26 of attachments 22 become aligned with the crop rows so that continued advancement of machine 10 forces the crops to be received within passages 26 and displaced rearwardly relative to the forwardly moving attachments 22. Noses 28 of each attachment 22 become disposed on opposite sides of the crop row and, because of the forwardly jutting attitude of noses 28 and the prolongated, low profile configuration of each member 24, crops which may be in a downed condition lying across furrows between the rows are readily lifted by the advancing members 24 toward an upright condition as machine 10 advances. As noses 28 slip beneath downed plants, the plants are gradually and gently brought to a substantially erect condition as they slide rearwardly along the inclined surfaces 32 which become progressively higher above the surface of the ground as pan 20 is approached. Accordingly, by the time the plants have reached the rear of passage 26, they are substantially erect with the fruit disposed above sickle 16 such that severance of the plants by sickle 16 results in the fruit being deposited into pan 20 while the lower stalk portions pass rearwardly beneath pan 20.

Note further that the pickup of downed or leaning crops is rendered even more fully effective by virtue of the fact that each member 24 of an attachment 22 can rise and fall independently of its adjacent member 24. Thus, for example, the members 24 all across the front of header 12 may be operating at slightly different levels because of differences in ground contour between adjacent crop rows and, should one member 24, for example, encounter an obstruction which causes it to rise up slightly to clear the obstruction, such upward movement is not imparted to any of the other members 24 because of their independent mountings on shafts 62. Accordingly, it is assured that each member 24 is always maintained in the lowest groundhugging position permitted by the ground surface along its particular row, thereby making certain that even those plants which have fallen flatly to the ground are engaged and lifted by the advancing members 24 upwardly into the passages 26.

Also noteworthy is the fact that the noses 28 of members 24 are maintained at all times in substantial parallelism with the ground surface, in spite of frequent up and down swinging movement of their members 24. Such is, of course, accomplished by the leveling linkage 90 attached to the rear of each nose 28 which automatically responds to swinging of the members 24 in one direction to hinge their noses 28 in the opposite direction. Hence, there is very little if any tendency for noses 28 to dig into the ground as machine 10 advances, and yet noses 28 can be rather sharply pointed as shown in the drawings to facilitate movement between crop rows, and the angular attitude of attachments 22 as a whole can be rather steep.

It is also important to emphasize at this juncture that the low profile configuration of attachments 22 involves not only the ability of members 24 to successfully slide under and gently lift downed or leaning crops, but also involves the elimination of a complex maze of belts, pulleys and other drive mechanisms situated in an overhead condition above passages 26. In this respect note that the drive for gathering elements 96, consisting of the shaft 116, pulleys 114 and 106, as well as the belts 108, is so situated that it in no way obstructs or interferes with the orderly progression of crops rearwardly through passages 26 to sickle 16. Frames 36 and hence drive shaft 116 are suspended neatly below pan 20 slightly behind sickle 16, and drive belts 108 are housed within the member 24 themselves on opposite sides of passages 26, thus rendering the latter wholly unobstructed from noses 28 to pan 20. From the instant crops enter passages 26 adjacent noses 28 they are left totally free of engagement with any structure whatsoever that would tend to twist, entangle and clog the same within passages 26 such that a substantially clog-free harvesting operation is guaranteed without the exasperating, costly and time-consuming shutdowns for cleanout which have characterized many previous row unit attachments. The only structures available for engaging the crops during their rearward displacement through passages 26 are the gathering elements 96 and proximal surfaces 30 and 32 of members 24, all of which cooperate to gently guide the crops rearwardly toward sickle 16 and to orient the same toward an upright condition prior to severance.

At the rear of passages 26, where severance of the fruit of the plants is accomplished by sickle 16, there is no structure whatsoever to interfere with the free gravitation of the severed fruit directly into pan 20 for further processing by the harvesting machine 10. It is at this point that jam-ups and clogging not infrequently occurred in previous machines, but it is at precisely this point in the present invention that the crops are the most totally unhindered in their movement. Note as shown in FIGS. 6 and 8 that the area immediately behind members 24 and above sickle 16 is totally devoid of obstructions which could become entangled with the crops presented thereto, and hence effectively all tendencies for jamming and clogging at this point are eliminated. Once severed, the fruit is completely free without hinderance to fall into the collecting pan 20.

Previous "high profile" row attachments have been objectionable not only from the standpoint of numerous opportunities for crop entanglement with overhead drive mechanisms and the like, but also because of the creation in such previous devices of restrictive throats at the rear discharge ends of the crop delivery passages of the attachments. In this respect it was not uncommon to force the rearwardly moving crops to pass between a pair of upright walls rising from the dividing members of an attachment before the crops could actually leave the passages and enter the pan of the header. Such upright walls inherently forced the tops of the rearwardly moving plants to crowd together laterally in order to pass between the narrow throat defined between the two walls, thereby substantially increasing the likelihood that the throats would become overloaded with jamming and clogging thereof being the natural result.

Of course, in the present invention, no such upright walls rising from the members 24 exist at the rear of passages 26, and hence the restrictive throat problems above referred to are completely eliminated. Those portions of the crops which extend above surfaces 30 of members 24 are free to move about laterally to such an extent as may be necessary to complete their delivery to sickle 16 for severance.

Once the row crop harvesting operations have been completed and the operator desires to revert to operations not requiring attachments 22, it is but a relatively simple job to remove the attachments 22 from header 12 in view of the sliding engagement of frames 36 with plates 44 and the releasable nature of clamps 54 and fasteners 46.

Having thus described the invention, what is claimed as new and desire to be secured by letters patent is:

1. In combination with a harvesting machine having a header provided with a sickle and a pan for receiving severed crops from the sickle, a plurality of low-profile row harvesting attachments mounted on said header forwardly of the pan, said attachments each including:
   a pair of elongated, laterally spaced-apart, downwardly and forwardly extending members defining a crop delivery passage extending from the front of said members rearwardly to said pan,
   each member being freely swingable in a vertical direction independently of the other member;
   crop-gathering means on said members including a pair of opposed, cooperable elements within and on opposite sides of said passage for engaging and directing rearwardly crops received within said passage during advancement of the machine,
   said members each having an inclined, fore-and-aft extending, uppermost surface presenting the upper extent of passage defining structure on said members between the front of the latter and said pan; and
   a drive for said elements operably coupled with the latter and disposed for the unobstructed, clog-free movement of crops through the passage and into said pan.

2. The combination as claimed in claim 1, wherein said drive includes a transversely extending drive shaft suspended below said pan.

3. The combination as claimed in claim 2, wherein said drive further includes means on opposite sides of each passage respectively operably coupling the elements with said shaft.

4. The combination as claimed in claim 1, wherein said members are each provided with means for limiting downward swinging thereof.

5. The combination as claimed in claim 4, wherein said limit means includes means yieldably biasing the corresponding member upwardly.

6. The combination as claimed in claim 1, wherein each member is provided with a vertically swingable nose at the front thereof, each nose having self-leveling means coupled therewith for maintaining the nose substantially parallel to the ground during swinging of its member.

7. The combination as claimed in claim 6, wherein said leveling means includes linkage between the header and each nose respectively for swinging the latter in a direction opposite to that of its member.

8. The combination as claimed in claim 1, wherein each pair of said members is shiftably mounted on said header for adjusting movement along the latter transversely of the normal path of travel of the machine.

9. The combination as claimed in claim 8, wherein each pair of members is provided with means for releasably retaining the same in a selected position along the header.

10. The combination as claimed in claim 8, wherein said drive includes a telescoping drive shaft common to both members.

11. The combination as claimed in claim 10, wherein said drive further includes means on each member operably coupling its gathering elements with said shaft.

12. The combination as claimed in claim 11, wherein said coupling means of the members is swingable with the members, said shaft being stationary with the header during such swinging of the members.

13. The combination as claimed in claim 12, wherein the axis of swinging of said members and the longitudinal axis of said shaft are disposed in juxtaposed relationship to one another.

14. A low-profile row crop attachment for a harvesting machine having a header provided with a sickle and a pan for receiving severed crops from the sickle, said attachment comprising:
 a frame;
 means for releasably attaching said frame to the header below said pan;
 a pair of elongated, laterally spaced-apart dividing members having rear ends mounted on said frame and front ends spaced forwardly from the frame,
 said members defining a longitudinally extending crop receiving passage therebetween from said front ends to said rear ends and each member being freely swingable on said frame in a vertical direction independently of the other member;
 crop-gathering means including a pair of opposed, crop-engaging elements disposed on opposite sides of said passage and extending between the opposed ends of said members for delivering crops through the passage and to the sickle when the attachment is on the header and the machine is advanced along a crop row; and
 a drive for said elements coupled with the latter without overhead obstructions in said passage whereby to provide smooth, orderly and clog-free movement of crops through the passage and into the pan during harvesting.

15. A low-profile, row crop attachment as claimed in claim 14, wherein said drive includes a drive shaft common to said members extending transversely of the passage below and rearwardly thereof.

16. A low-profile, row crop attachment as claimed in claim 15, wherein said drive further includes means on each side of said passage respectively operably coupling said elements with said shaft.

17. A low-profile, row crop attachment as claimed in claim 16, wherein said shaft is held by said frame against swinging and said coupling means is swingable with the members.

18. A low-profile, row crop attachment as claimed in claim 14, wherein each of said members is provided with means for yieldably urging the same upwardly.

19. A low-profile, row crop attachment as claimed in claim 14, wherein each of said members is provided with a vertically hingeable nose and with means for maintaining the same substantially parallel to the ground during up-and-down swinging of its member.

20. A low-profile, row crop attachment as claimed in claim 14, wherein said attaching means includes a track, said frame being adjustably shiftable along said track for changing the position of the attachment along the header.

21. A low-profile, row crop attachment as claimed in claim 20, wherein said drive includes a drive shaft carried by said frame, said shaft including a pair of relatively telescoping sections shiftable into and out of one another during said adjustable shifting of the frame.

22. A low-profile, row crop attachment as claimed in claim 14, wherein said gathering elements are disposed in oppositely inclined planes which converge upwardly toward one another.

23. A row crop attachment for a harvesting machine having a header provided with a sickle and a pan for receiving severed crops from the sickle, said attachment comprising:
 a frame;
 means for releasably attaching said frame to the header;
 a pair of elongated, laterally spaced-apart dividing members having rear ends mounted on said frame and free front ends spaced forwardly from the frame,
 said members defining a longitudinally extending crop receiving passage therebetween from said front ends to said rear ends and each member being freely swingable on said frame in a normally vertical direction independently of the other member;
 crop-gathering means including a pair of opposed, crop-engaging elements disposed on opposite sides of said passage and extending between the opposite ends of said members for delivering crops through the passage and to the sickle when the attachment is on the header and the machine is advanced along a crop row; and
 a drive coupled with said elements for operating the same.

* * * * *